(12) United States Patent
Chase

(10) Patent No.: US 10,232,939 B2
(45) Date of Patent: Mar. 19, 2019

(54) AIRCRAFT SEED BROADCASTING SYSTEMS, APPARATUS AND METHODS

(71) Applicant: Mansfield Heliflight, Inc., Milton, VT (US)

(72) Inventor: Eric D. Chase, Burlington, VT (US)

(73) Assignee: Mansfield Heliflight, Inc., Milton, VT (US)

( * ) Notice: Subject to any disclaimer, the term of this patent is extended or adjusted under 35 U.S.C. 154(b) by 313 days.

(21) Appl. No.: 15/223,989

(22) Filed: Jul. 29, 2016

(65) Prior Publication Data

US 2017/0029109 A1    Feb. 2, 2017

Related U.S. Application Data

(60) Provisional application No. 62/199,688, filed on Jul. 31, 2015.

(51) Int. Cl.
| | | |
|---|---|---|
| *B64D 1/18* | (2006.01) | |
| *A01C 7/08* | (2006.01) | |
| *A01C 17/00* | (2006.01) | |

(52) U.S. Cl.
CPC ............... *B64D 1/18* (2013.01); *A01C 17/00* (2013.01); *A01C 7/085* (2013.01)

(58) Field of Classification Search
CPC .... B64D 1/18; B64D 1/16; B64D 1/00; A01C 7/085; A01C 7/08; A01C 7/00; A01C 17/00
See application file for complete search history.

(56) References Cited

U.S. PATENT DOCUMENTS

| | | |
|---|---|---|
| 3,476,337 A | 11/1969 | Cornett, Jr. |
| 3,944,137 A | 3/1976 | Cutchins et al. |
| 3,968,933 A | 7/1976 | Waldrum |

FOREIGN PATENT DOCUMENTS

| | | |
|---|---|---|
| CN | 2105828 U | 6/1992 |
| CN | 1069847 A | 3/1993 |
| CN | 2585813 Y | 11/2003 |
| CN | 100429971 C | 11/2008 |

*Primary Examiner* — Christopher J. Novosad
(74) *Attorney, Agent, or Firm* — Downs Rachlin Martin PLLC

(57) ABSTRACT

An aerial seeding system that may be installed in an aircraft in a modular form with minimal modification to the existing aircraft configuration, and, in particular, without any structural modifications that would adversely impact the integrity of the aircraft structure or its overall air worthiness. Exemplary embodiments include an active and controllable seed distribution mechanism to ensure continuously controllable and even distribution of seeds. Basic system components include a modular seed hopper, a seed broadcasting head and a hydraulic system driven by a pump connected to an aircraft accessory drive.

18 Claims, 4 Drawing Sheets

AIRCRAFT SEED BROADCASTING SYSTEMS, APPARATUS AND METHODS

RELATED APPLICATION DATA

This application claims the benefit of priority of U.S. Provisional Patent Application Ser. No. 62/199,688, filed on Jul. 31, 2015, and titled "Aircraft Seed Broadcasting Apparatus," which is incorporated by reference herein in its entirety.

FIELD OF THE INVENTION

The present disclosure relates to aircraft seed broadcasting, and, more particularly, to modularized systems, and related apparatus and methods to provide aircraft mounted seed broadcasting without structural modifications to the aircraft.

BACKGROUND

Potential advantages associated with aerial seeding or sowing are well-known in the agricultural industry. However, in spite of the potential, systems for aerial seeding are not well designed to exploit those advantages. Existing systems fall into generally two categories: systems based on crop dusting technology utilizing modifications to nozzle/sprayer systems intended primarily for liquids/pesticide application, and passive systems that utilize buckets, chutes or similar structures and which rely primarily on the turbulence surrounding the aircraft in motion to distribute the seeds.

One challenge in creating an effective aerial seeding system is that in most countries modifications to licensed aircraft, such as airplanes and helicopters, must be approved by a governmental agency to ensure safety and airworthiness. In the United States, the agency is the Federal Aviation Administration (FAA). Under FAA regulations, not just modification, but also addition of equipment must meet stringent approval requirements. Thus, while the patent literature contains numerous different design proposals for seeding systems, few of these are practical or even useable due to the fact that they require either an entirely new aircraft or extensive changes, additions or modifications to be mounted and flown in an existing aircraft.

SUMMARY OF THE DISCLOSURE

In one implementation, the present disclosure is directed to an aircraft seed broadcasting system that includes a seed hopper configured and dimensioned to be insertable through a door frame of an aircraft and mountable to pre-existing aircraft mounting points; a broadcasting head configured and dimensioned to be mounted to an underside of the aircraft fuselage below the seed hopper to broadcast seeds received from hopper; and a power supply system configured to drive the broadcasting head.

In another implementation, the present disclosure is directed to an aircraft seed broadcasting system that includes a seed hopper comprising plural separable members each configured and dimensioned to be insertable individually through a passenger door frame of an aircraft, assembled into the seed hopper within the aircraft and mounted to existing passenger seat and seatbelt attachment points; a broadcasting head comprising a body defining a seed plenum leading to a motor driven rotating distribution disk, the body configured and dimensioned to be mounted along a centerline on an underside of the aircraft fuselage below the assembled and mounted seed hopper to receive seeds from the hopper; and power supply components configured to provide aircraft supplied power to the motor driven rotating distribution disk.

In yet another implementation, the present disclosure is directed to a method of installing a seed broadcasting system in an aircraft. The method includes removing an aircraft passenger seat from a passenger space; inserting a seed hopper through an aircraft passenger door into the passenger space; forming at least one hole through a non-structural fuselage skin portion on the bottom of the aircraft in the passenger space; mounting the seed hopper to pre-existing mounting points in the passenger space with a feed chute extending through the at least one hole in the fuselage skin; mounting a seed broadcasting head including a motor driven rotating distribution disk on an underside of the aircraft fuselage in a position to communicate with the feed chute through the at least one hole to receive seeds therefrom; and connecting a broadcasting hydraulic system to a hydraulic pump driven by an accessory drive to power the motor driven rotating head.

DESCRIPTION OF THE DRAWINGS

For the purpose of illustrating the invention, the drawings show aspects of one or more embodiments disclosed herein. However, it should be understood that the inventions embodied in this disclosure are not limited to the precise arrangements and instrumentalities shown in the drawings, wherein.

DETAILED DESCRIPTION

Figure 1:
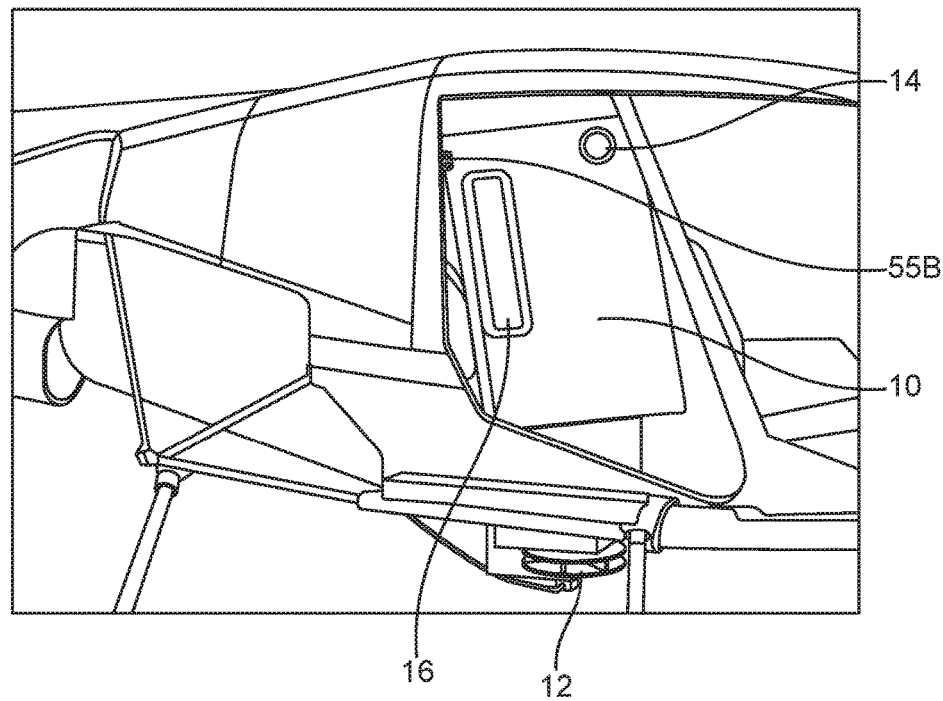
FIG. 1 is a partial starboard side view of an aircraft with an exemplary embodiment of an aerial seed broadcasting system installed therein.
Figure 2:
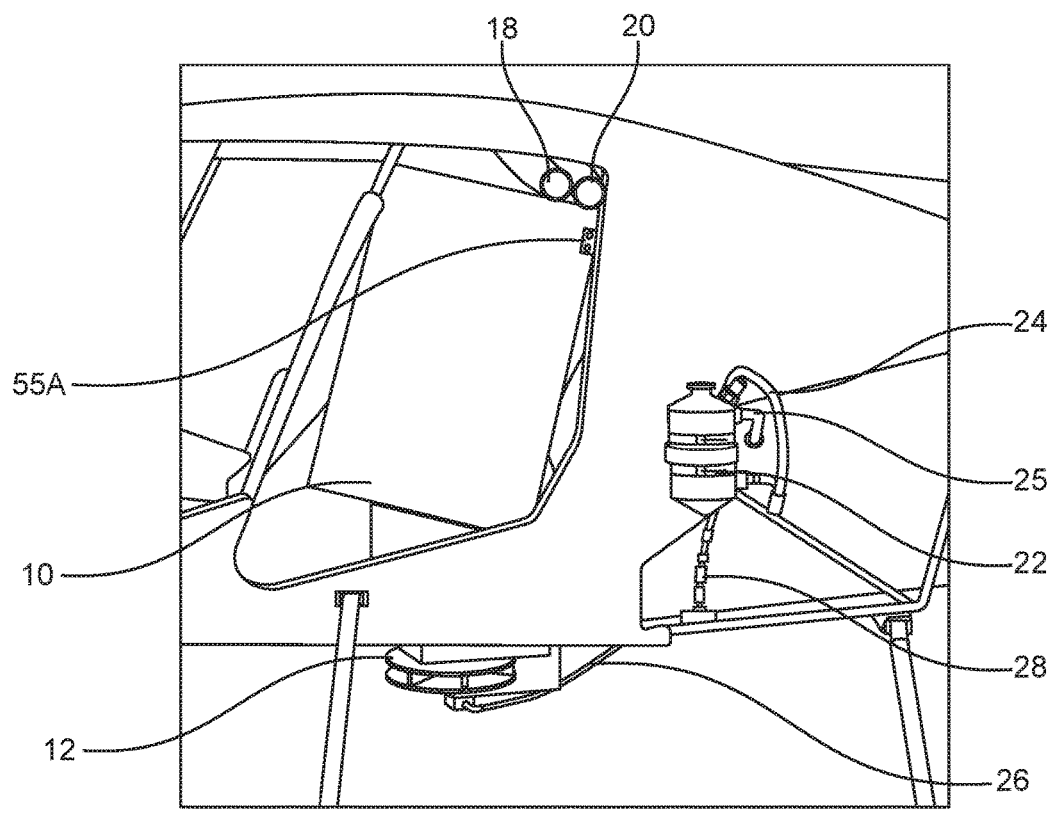
FIG. 2 is a partial port side view of the aircraft shown in FIG. 1 with the embodiment of the disclosed system.

Embodiments disclosed herein provide a system for aerial broadcasting of seeds or other similar materials in modular form to facilitate installation and removal from the aircraft. Also disclosed are methods for installing such a modular system without altering airworthiness. Modules may generally comprise a seed hopper, broadcasting head and hydraulic supply components. In one embodiment disclosed herein, as shown in FIGS. 1 and 2, an aircraft seed broadcasting system includes a seed hopper 10 mountable in a passenger space or rear seat area of the aircraft, and a broadcasting head 12 mounted to the underside of the aircraft fuselage to broadcast seeds received from hopper 10. A seed input port 14 is provided in an upper portion of the hopper wall, and sight gage 16 allows an operator to visually determine the fill level of the hopper. Vents 18, 20 are provided at the top of hopper 10.

Components of disclosed embodiments may be readily fabricated from aviation quality materials and incorporated into the aircraft with a minimum of alteration to the aircraft. In one illustrative example, an embodiment of the disclosed system is installed in a four-place R-44 series helicopter by the Robinson Helicopter Company as shown in the present figures. As will be appreciated by those skilled in the art, the disclosed system may be readily adapted to other aircraft types without significant changes. While persons of ordinary skill may adapt embodiments disclosed herein to virtually any aircraft, aircraft most suited for use with embodiments of the invention include fixed wing or helicopter aircraft with a passenger space/seat positioned behind the pilot position, enterable by at least one passenger door. To facilitate installation and minimize aircraft alterations, attachment points for system components may solely comprise preexisting aircraft mounting points, such as seat support structure and seatbelt attachments. In the illustrated example, hopper 10 is mounted in the rear passenger compartment with attachment points encompassing all six of the seat belt hard points to secure the unit.

As described in more detail below and shown in FIG. 2, broadcasting head 12 is powered by a hydraulic motor which receives hydraulic fluid pressure generated by an existing aircraft system, such as the air conditioning system. In the illustrated Robinson R-44 embodiment, system power is provided by a factory-approved air conditioning drive mounted to the left-hand, rear drive pad of the O-540 engine. A separate hydraulic tank 22 is provided for the broadcasting head hydraulic system. Tank 22 has a tank vent 24 and hydraulic supply and return lines 28, 25. The hydraulic lines are routed to broadcasting head 12 via conduit 26.

As illustrated in FIG. 2, hydraulic tank 22 may be attached to the left side of the R-44 helicopter using two 0.75×0.040 stainless steel band clamps fastened to 0.050 plate of 2024 T3 aluminum with four MS27039-1-20 screws, four AN970-3 washers and four MS21042L3 nuts. The 0.050 plate is attached to the helicopter using five preexisting MS21069L08 nut plates and five MS27039-0808 screws along the forward facing and top edge of the plate. Two additional MS27039-1-14 screws, two MS21042L3 nuts and two MS21919WDG16 clamps attach the middle and aft ledge of the plate to the C046-19 Robinson lower-left frame assembly.

Figure 3:
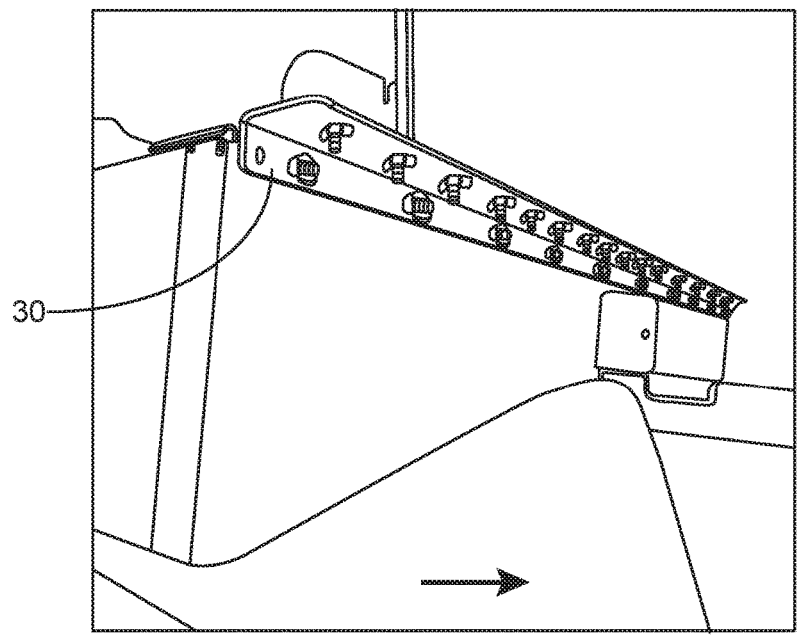
FIG. 3 is a detailed view of the rear seat area where portions of the exemplary broadcasting system are installed.

To install hopper 10, the rear seat of the aircraft is removed and hopper mounting stringer 30 is bolted to the existing seat support structure as shown in FIG. 3. In one exemplary embodiment as illustrated, stringer 30 may be constructed out of 0.032 2024 T3 aluminum and fitted with 12 MS21075-08L nut plates where 12 MS27039-0808 screws attach the stringer to the vertical forward face of the seat bottom using the pre-existing holes that the seat cushions utilize when the seat bottoms are installed. Stringer 30, once installed, provides twenty MS21075-08L nut plates to which the hopper bottom can be attached to the airframe.

Figure 4:
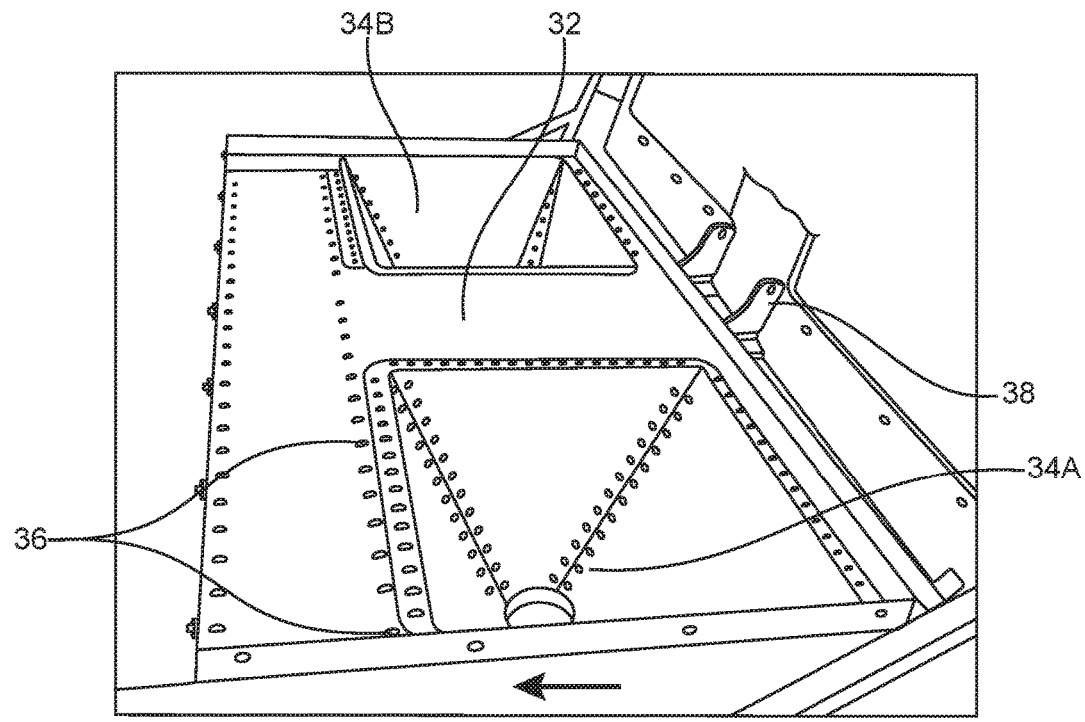
FIG. 4 is a view of a hopper bottom installed in an aircraft in accordance with an exemplary embodiment disclosed herein.

Hopper 10 may be constructed from six sub-panels. Hopper bottom 32, including generally pyramid-shaped feed chutes 34A, 34B, is bolted to stringer 30 through bolt holes 36 as shown in FIG. 4. In an exemplary embodiment, twenty bolt holes 36 are provided to accommodate twenty MS27039-0808 screws that pass down through the hopper bottom 32 and attach to stringer 30. Mounting brackets 38 provide for connection to middle rear seat seatbelt attachment points.

Figure 5:
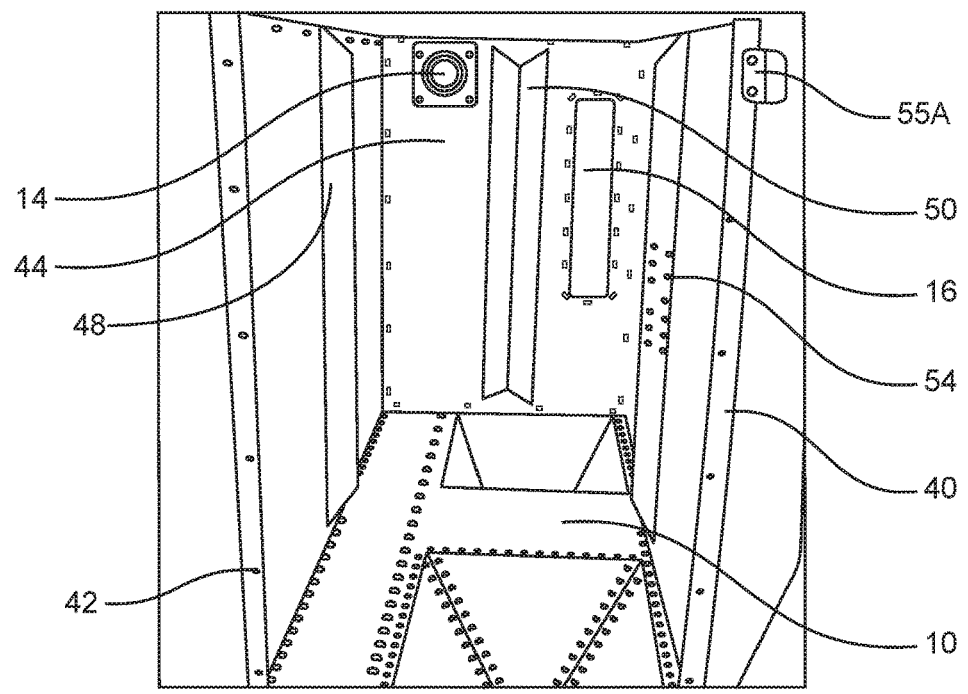
FIG. 5 is a view of a partially assembled hopper, with hopper walls mounted on the hopper bottom shown in FIG. 4.

Hopper bottom 32 may be constructed out of 0.040 2024-T3 aluminum and riveted together with MS20470AD4-4 rivets. The attachment points and the four angles that encompass the perimeter of the panel are constructed from 6061T6 aluminum. There are four one inch angles which have twenty-two MS21075-08L nut plates riveted in place on a five inch spacing pattern to provide attachment points for the four vertical side panels of the hopper to attach to. Three panels, rear wall 40, forward wall 42 and starboard wall 44, are shown in FIG. 5. The port wall is removed to permit viewing of the interior of the hopper. The side panels making up the four hopper vertical walls may be constructed from 0.032 2024-T3 aluminum. The forward and aft walls 42, 40, may have three one inch angles constructed from 6061T6 aluminum and riveted to these panels using MS20470AD4-4 rivets with eighteen MS21075-08L nut plates riveted in place on a five inch spacing pattern. The left and right walls may be constructed out of 0.032 2024-T3 aluminum and have one 6061T6 aluminum one inch angle attached to the top edge of these panels which holds 5 MS21075-08L nut plates on a five inch spacing pattern. The hopper top (not shown in the figures) may be constructed from 0.020 2024-T3 aluminum. Each hopper sidewall is provided with an interior stiffening member 48, 50, 54. All six hopper panels are attached together utilizing the MS21075-08L nut plates and MS27039-0808 screws. All the panels are removable in order to fit hopper 10 into the aircraft one panel at a time so that the hopper may be assembled within the passenger space.

Attachment brackets 55A, 55B are each attached to hopper 10 and to the aircraft rear seatbelt top attachment points. As best seen in FIG. 5 (also FIGS. 1 and 2), bracket 55A is located on the left-hand side of the aircraft and the head of the NAS6604-18 bolt that the OEM uses to attach to the shoulder harness guide assembly of the seatbelt to the airframe can be seen.

Figure 6:
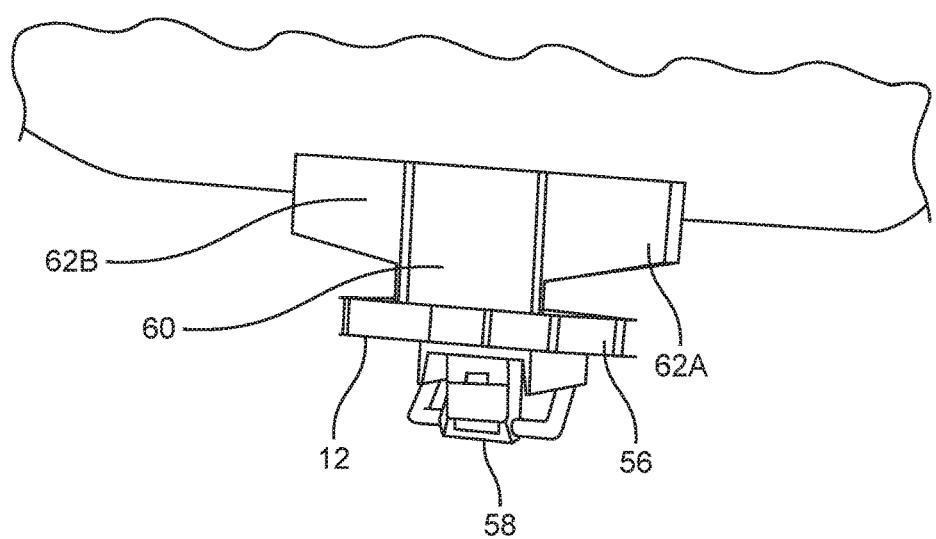
FIG. 6 is a detailed view of a seed broadcasting head according to an exemplary embodiment of the present disclosure, mounted on the underside of the aircraft fuselage.
Figure 7:
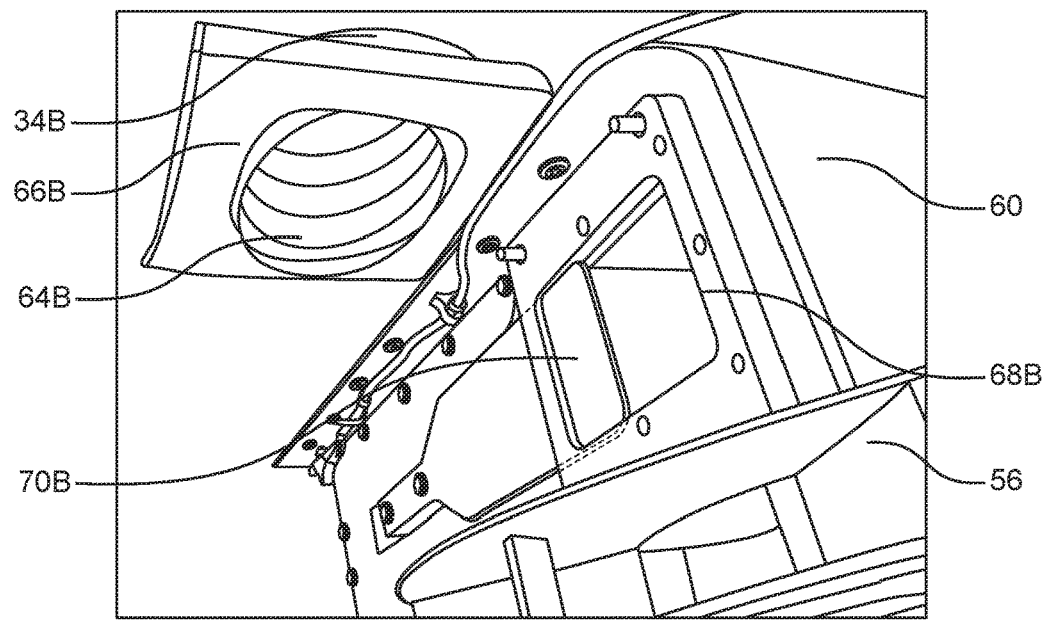
FIG. 7 is a close view of the broadcasting head shown in FIG. 6 with a seed delivery duct removed for illustration purposes.
Figure 8:
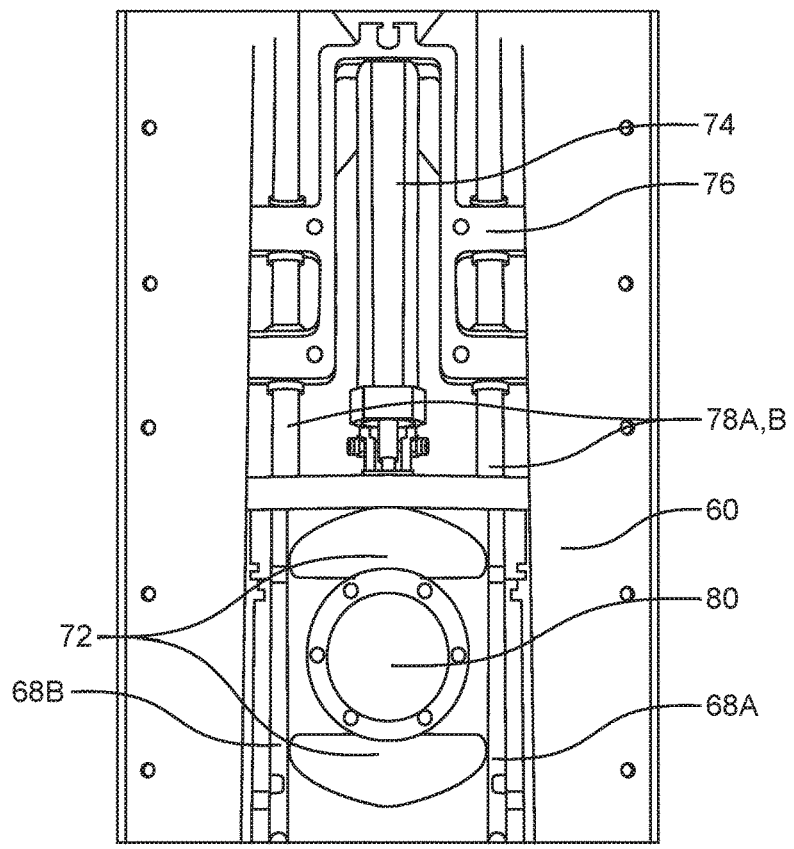
FIG. 8 is a detailed plan view of internal components of the broadcasting head shown in FIG. 6.

In order to provide communication between hopper 10 within the aircraft cabin, and broadcasting head 12 located under the fuselage, two holes are cut in a non-structural portion of the fuselage belly skin under each passenger rear seat to receive the outlets of each of feed chutes 34A, 34B (FIG. 4). The shape of the feed chutes and position of the broadcasting head directly under the feed chutes allows for gravity feed of materials to be broadcast from hopper 10 directly into broadcasting head 12. In one exemplary embodiment, the two holes may be four inches in diameter and strengthened with an aluminum 2024-T3 0.032 ring doubler and fitted with six nut plates and riveted in place in accordance with FAA Reg. 43.13. As illustrated by FIGS. 6-8, seeds or other material to be broadcast is delivered to rotating distribution disk 56 of broadcast head 12 from feed chutes 34A, 34B via delivery ducts 62A, 62B and then through head body 60. The delivery ducts may have a flat, angled bottom to direct materials to the head body. In one embodiment, the delivery duct bottom angle may be at about 12°.

As shown in FIG. 7, in which delivery duct 62B is removed to facilitate view of other parts, connector duct 64B connects the outlet of feed chute 34B with delivery duct 62B. Gasket 66B prevents leakage of materials passing therethrough. Materials delivery into head body 60 is through door 68B, controlled by remotely controlled slide gate 70B. It should be noted that the structure shown in FIG.

7 corresponds to the starboard side of broadcasting head 12 and that the same structure is mirrored on the port side.

Materials passing through doors 68A, 68B are received in head body 60 and delivered to distribution disk 56 through plenum 72 as shown in FIG. 8. Doors 68A, 68B are driven by actuator servo 74, which connect to each door through actuator arm 76. Rotation of servo 74 delivers forward and aft linear motion, guided by linear slide bearings 78A,B, for each of doors 68A, 68B, respectively. A switch for turning linear actuator servo 74 on and off may be conveniently located in the cockpit within the pilot's easy reach.

In one exemplary embodiment, the components of broadcasting head 12 may be constructed out of 6061 aluminum and fastened together with grade 5 hardware. Hydraulic motor 58 that drives distribution disc 56 (FIG. 6) may be selected by persons of ordinary skill for compatibility with a hydraulic system including a pump driven off of the aircraft accessory drive pad. In the example of the Robinson R-44 helicopter as shown in the figures, a Parker gear pump, part number MGG20016 BB1B3 (not shown), was used. This is the same motor/pump that drives the distribution pump off of the OEM air conditioning drive.

Provision of electrical controls for the system disclosed may create as few as two electrical impacts to the aircraft. The first electrical impact is a solenoid-type switch controlling the flow of the hydraulic fluid from pump to pump and pump to tank. The second electrical impact is actuator 74 that opens and closes the gravity-fed doors 68A, 68B. In the R-44 exemplary embodiment shown, the solenoid switch may be a 12 volt solenoid-type switch with a 5 amp circuit breaker, and the actuator may be a 12 volt linear actuator with a 10 amp circuit breaker.

With a system thus designed, it is possible to maintain weight and balance within the standard limits aircraft CG and gross weight parameters, both with the system fully loaded and completely empty. In the exemplary embodiment of the R-44 helicopter shown in the figures, the entire system installed weighs approximately 91.0 pounds.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of this disclosure.

What is claimed is:

1. An aircraft seed broadcasting system, comprising:

a seed hopper configured and dimensioned to be insertable through a door frame of an aircraft and mountable to pre-existing aircraft mounting points;

a broadcasting head configured and dimensioned to be mounted to an underside of the aircraft fuselage below the seed hopper to broadcast seeds received from the seed hopper; and a power supply system configured to drive the broadcasting head;

wherein the door frame is a passenger door frame and said pre-existing aircraft mounting points comprise a passenger seat support structure and corresponding seatbelt attachment points.

2. The aircraft seed broadcasting system of claim 1, wherein said power supply system comprises a broadcasting hydraulic system configured to be powered by an aircraft accessory drive and the broadcasting head includes a rotating distribution disk driven by a hydraulic motor.

3. The aircraft seed broadcasting system of claim 1, wherein said seed hopper comprises plural separable members each configured and dimensioned to be insertable individually through the door frame of the aircraft and assemblable into said seed hopper within the aircraft.

4. The aircraft seed broadcasting system of claim 3, wherein one said separable member comprises a hopper bottom defining two spaced-apart feed chutes.

5. An aircraft seed broadcasting system, comprising:

seed hopper configured and dimensioned to be insertable through a door frame of an aircraft and mountable to pre-existing aircraft mounting points;

a broadcasting head configured and dimensioned to be mounted to an underside of the aircraft fuselage below the seed hopper to broadcast seeds received from the seed hopper; and a power supply system configure to drive the broadcasting head;

wherein said power supply system comprises broadcasting hydraulic system configured to be powered by an aircraft accessory drive and the broadcasting head includes a rotating distribution disk driven by a hydraulic motor; and wherein the broadcasting hydraulic system includes a hydraulic tank configured to be attached to preexisting mounting points on the aircraft.

6. An aircraft seed broadcasting system, comprising:

a seed hopper configured and dimensioned to be insertable through a door frame of an aircraft, and mountable to pre-existing aircraft, mounting points;

a broadcasting head configured and dimensioned to be mounted to an underside of the aircraft fuselage below the seed hopper to broadcast seeds received from the seed hopper; and a power supply system configured to drive the broadcasting head;

wherein the broadcasting head comprises:

a motor driven, rotating distribution disk configured to distribute seeds;

a body configured to be mounted longitudinally along the aircraft centerline and defining a seed plenum communicating with a top of the rotating distribution disk;

seed delivery ducts extending transversely on opposite sides of the body positioned to convey seeds from the hopper to the body; and remotely actuatable seed flow control doors between each seed delivery duct and the body.

7. The aircraft seed broadcasting system of claim 6, wherein said remotely actuated seed flow control doors comprise sliding gates.

8. The aircraft seed broadcasting system of claim 6, wherein the seed hopper comprises a hopper bottom with two transversely spaced feed chutes, the seed hopper configured and dimensioned to position each said feed chutes above one said seed delivery duct when installed in the aircraft.

9. The aircraft seed broadcasting system of claim 8, wherein the transversely spaced feed chutes are configured to extend through a fuselage skin portion and said feed chutes further comprise connectors configured to connect and deliver seeds from said chutes to said delivery ducts.

10. The aircraft seed broadcasting system of claim 6, further comprising a broadcasting electrical system consisting essentially of a switch controlling the distribution disk motor, and an actuator and switch for controlling the seed flow control doors.

11. An aircraft seed broadcasting system, comprising:

a seed hopper comprising plural separable members each configured and dimensioned to be insertable individually through a passenger door frame of an aircraft, assembled into said seed hopper within the aircraft and mounted to existing passenger seat and seatbelt attachment points;

a broadcasting head comprising a body defining a seed plenum leading to a motor driven rotating distribution disk, said body configured and dimensioned to be mounted along a centerline on an underside of the aircraft fuselage below the assembled and mounted seed hopper to receive seeds from said hopper; and power supply components configured to provide aircraft supplied power to the motor driven rotating distribution disk.

12. The aircraft seed broadcasting system of claim 11, further comprising:

seed ducts extending transversely on opposite sides of the body, the seed ducts configured to communicate with a feed chute formed in a bottom of the seed hopper through holes in a non-structural, skin portion of the fuselage; and remotely actuatable gate disposed between each seed duct and the body for controlling flow of seed to the rotating distribution disk.

13. The aircraft seed broadcasting system of claim 11, further comprising a hydraulic motor driving the rotating distribution disk, wherein said power supply components comprise broadcasting hydraulic system components configured to be driven off of an aircraft accessory drive.

14. The aircraft seed broadcasting system of claim 13, comprising in combination the aircraft with the broadcasting hydraulic system including a hydraulic pump driven by the aircraft accessory drive to provide pressurized hydraulic fluid.

15. The aircraft seed broadcasting system of claim 14, wherein said aircraft is a helicopter.

16. The aircraft seed broadcasting system of claim 14, wherein said hydraulic pump is a gear pump.

17. A method of installing a seed broadcasting system in an aircraft, comprising:

removing an aircraft passenger seat from a passenger space;

inserting a seed hopper through an aircraft passenger door into the passenger space;

forming at least one hole through a non-structural fuselage skin portion on the bottom of the aircraft in the passenger space;

mounting the seed hopper to pre-existing mounting points in the passenger space with a feed chute extending through said at least one hole in the fuselage skin;

mounting a seed broadcasting head including a motor driven rotating distribution disk on an underside of the aircraft fuselage in a position to communicate with said feed chute through said at least one hole to receive seeds therefrom; and connecting a hydraulic pump to an aircraft accessory drive to power the motor driven rotating head; and wherein said inserting a seed hopper comprises inserting plural, separate seed hopper members through the passenger door and assembling said members to form a seed hopper within the aircraft.

18. The method of claim 17, wherein:

said seed hopper includes two transversely spaced feed chutes;

said forming at least one hole comprises forming two holes transversely and evenly spaced on opposite sides of the aircraft centerline corresponding to the spacing of the two feed chutes; and said mounting the seed hopper further comprises positioning each said feed chute to communicate with the broadcasting head through one said hole.

* * * * *